United States Patent
Abou-Rizk et al.

(10) Patent No.: US 10,531,314 B2
(45) Date of Patent: Jan. 7, 2020

(54) HEURISTIC OPTIMIZATION OF PERFORMANCE OF A RADIO FREQUENCY NODAL NETWORK

(71) Applicant: ABL IP HOLDING LLC, Conyers, GA (US)

(72) Inventors: Mitri J. Abou-Rizk, Newton, MA (US); Emanuel Paul Malandrakis, Boston, MA (US); Pranav Kuber, Somerville, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 2 days.

(21) Appl. No.: 15/816,632

(22) Filed: Nov. 17, 2017

(65) Prior Publication Data

US 2019/0159044 A1    May 23, 2019

(51) Int. Cl.
*H04L 12/927* (2013.01)
*H04W 24/02* (2009.01)
(Continued)

(52) U.S. Cl.
CPC ............ *H04W 24/02* (2013.01); *H04L 43/50* (2013.01); *H04L 45/26* (2013.01); *H04W 24/08* (2013.01)

(58) Field of Classification Search
CPC ..... H04W 24/00; H04W 24/02; H04W 24/04; H04W 24/06; H04W 24/08; H04W 24/10; H04W 28/16; H04W 40/02; H04W 52/0212; H04W 52/04; H04W 72/12; H04W 76/10; H04L 1/0002; H04L 1/0003; H04L 1/1671; H04L 27/12; (Continued)

(56) References Cited

U.S. PATENT DOCUMENTS

| 8,724,479 | B1 * | 5/2014 | Aybay .............. H04L 49/1515 370/242 |
| 9,711,047 | B1 | 7/2017 | Knas et al. |

(Continued)

OTHER PUBLICATIONS

Vinicius C.M. Borges, et al., "Cross-layer routing metrics for mesh networks: Current status and research directions." Computer Communications 34:681-703 (2011).
(Continued)

*Primary Examiner* — Mansour Oveissi
*Assistant Examiner* — David M Oveissi
(74) *Attorney, Agent, or Firm* — RatnerPrestia

(57) ABSTRACT

The disclosure provides an example of a system including a radio frequency (RF) nodal network and a gateway coupled to the RF nodal network. The gateway is configured to transmit control packets the control packets having an initial parameter setting for each node in the RF nodal network. The selected nodes among the network of nodes are configured to transmit a number of test packets for each of a plurality of tests is greater than throughput saturation of the RF nodal network. The system includes a server coupled to the gateway and is configured to perform network performance analysis based on the test packets for each of the plurality of tests received by the gateway. The server updates parameter settings to optimize performance of the nodes of the RF nodal network to attain the target network performance metric based on a result of the network performance analysis.

30 Claims, 9 Drawing Sheets

(51) Int. Cl.
*H04L 12/26* (2006.01)
*H04L 12/721* (2013.01)
*H04W 24/08* (2009.01)

(58) Field of Classification Search
CPC ... H04L 41/0896; H04L 41/509; H04L 43/50; H04L 45/26; H04L 47/30; H04L 47/125; H04L 47/2416; H04L 65/80; H04L 65/1069; Y02D 70/00; Y02D 70/30; Y02D 70/142
See application file for complete search history.

(56) References Cited

U.S. PATENT DOCUMENTS

| | | | |
|---|---|---|---|
| 9,711,048 B1 | 7/2017 | Knas et al. | |
| 9,721,451 B1 | 8/2017 | Knas et al. | |
| 9,741,237 B1 | 8/2017 | Knas et al. | |
| 9,743,301 B1* | 8/2017 | Earl | H04W 24/08 |
| 9,877,266 B1 | 1/2018 | Knas et al. | |
| 9,877,298 B1 | 1/2018 | Knas et al. | |
| 9,881,484 B1 | 1/2018 | Knas et al. | |
| 9,949,091 B1 | 4/2018 | Knas et al. | |
| 9,984,556 B1 | 5/2018 | Knas et al. | |
| 2005/0130645 A1* | 6/2005 | Albert Dobson | H04L 41/00 455/423 |
| 2007/0072599 A1* | 3/2007 | Romine | H04W 24/00 455/423 |
| 2009/0252052 A1* | 10/2009 | Sambhwani | H04W 52/16 370/252 |
| 2010/0042716 A1* | 2/2010 | Farajidana | H04W 16/10 709/224 |
| 2010/0150318 A1* | 6/2010 | Irenze | H04L 43/50 379/21 |
| 2012/0013748 A1* | 1/2012 | Stanwood | H04L 41/5022 348/192 |
| 2013/0114446 A1* | 5/2013 | Liu | H04W 24/10 370/252 |
| 2013/0242781 A1* | 9/2013 | Hui | H04W 52/0212 370/252 |
| 2014/0204794 A1 | 7/2014 | El-Najjar et al. | |
| 2015/0042240 A1 | 2/2015 | Aggarwal et al. | |
| 2015/0223249 A1 | 8/2015 | Ganu et al. | |
| 2015/0264590 A1* | 9/2015 | Michl | H04W 24/06 455/67.14 |
| 2016/0105344 A1 | 4/2016 | Kim et al. | |
| 2016/0112894 A1* | 4/2016 | Lau | H04W 24/10 370/252 |
| 2016/0292058 A1* | 10/2016 | Sathyanarayana | H04L 65/4069 |
| 2017/0149626 A1* | 5/2017 | Yoon | H04W 4/029 |
| 2017/0310581 A1* | 10/2017 | Endo | H04L 41/0677 |
| 2017/0339589 A1* | 11/2017 | Reijonen | H04W 24/10 |
| 2018/0048553 A1* | 2/2018 | Hyoudou | H04L 43/0852 |
| 2018/0338187 A1* | 11/2018 | Ketonen | H04N 21/64738 |

OTHER PUBLICATIONS

Roopali Garg et al. "Modified Neighbour Coverage Based Probabilistic Rebroadcast in MANET," International Journal of Advanced Research in Electrical Electronics. and Instrumentaiton Engineering, vol. 3(5) (May 2014).
Gisu Park et al., "An Adaptive Parameter Setting Algorithm to Enhance Performance in Self-Organizing Bluetooth Low Energy Ngtworks." Wireless Pers . Commun. (2016) 87: 953.
T. H. Szymanski, "Throughput and QoS Optimization in Nonuniform Multichannel Wireless Mesh Networks," Q2SWinet'08—Proceedings of the 4th ACM Workshop on Q2S and Security for Wireless and Mobile Networks, Vancouver, British Columbia, Canada. Oct. 27-28, 2008.
International Search Report for International Application No. PCT/US2018/061011, dated Jan. 24, 2019, 8 pages.

* cited by examiner

HEURISTIC OPTIMIZATION OF PERFORMANCE OF A RADIO FREQUENCY NODAL NETWORK

TECHNICAL FIELD

The present subject matter relates to methods, systems and apparatuses for optimizing a radio frequency (RF) nodal network of nodes for performance based on parameter settings of respective nodes.

BACKGROUND

Many prior optimization techniques have been addressed in various classes of networks, routing protocols, routing metrics, and path computation algorithms are well-known tools for minimizing the number of node-to-node message hops and thus improving performance. However, such tools have been addressed to meshes in which routing is controllable, which is not the case for a network such as a luminaire-based indoor positioning system consisting of simple, independent nodes that broadcast mesh packets indiscriminately. Other known techniques have addressed self-configuration of nodes in mobile ad hoc meshes and adaptive adjustment of Bluetooth Low Energy (BLE) device parameters to enhance the discovery process (identification of an in-range BLE device). However, such techniques have not addressed the automated or adaptive adjustment of node device parameters to optimize performance metrics, e.g., throughput of data from client devices to a gateway. Further techniques for increasing throughput and quality of service in wireless mesh networks have been proposed that assume a network having directed links and coordinated scheduling of link transmissions to enable a non-uniform system. However, such techniques are not applicable to networks utilizing broadcast nodes such as the RF nodes whose internode communications are inherently non-directed and nonscheduled.

SUMMARY

Hence, there is a need for a system and method for heuristically optimizing performance of a nodal network by adjusting the parameters of broadcast nodes in a wireless nodal network such as the RF nodal network in order to maximize the rate of data flow through the RF nodal network.

A system, for example, may include a radio frequency (RF) nodal network of nodes such that each node includes a radio frequency (RF) device. The system also includes a gateway coupled to the RF nodal network such that the gateway is configured to transmit through the RF nodal network, control packets that set a parameter of each node in the RF nodal network to an initial parameter setting. The initial parameter setting configures each of the nodes to perform at a level intended to enable the RF nodal network to meet a target network performance metric. The selected nodes among the network of nodes are configured to transmit a total number of test packets greater than throughput saturation of the RF nodal network. The gateway is further configured to receive test packets. The system further included a server coupled to the gateway to receive the test packets from the gateway and is configured to perform network performance analysis based on the received test packets. The server generates updated parameter settings to optimize performance of the nodes of the RF nodal network to attain the target network performance metric based on a result of the network performance analysis. The gateway is further configured to receive the updated parameter settings from the server, and to transmit the updated parameter settings to the nodes of the RF nodal network.

An example of a method involves transmitting, by a gateway, through a RF nodal network of nodes, control packets that set a parameter of each node in the RF nodal network to an initial parameter setting. The initial parameter setting configures each of the nodes to perform at a level intended to enable the RF nodal network to meet a target network performance metric. The gateway is coupled to the RF nodal network and each node in the RF nodal network includes a RF device. The method involves transmitting, from selected nodes of the RF nodal network, a number of test packets. The number of test packets transmitted by the selected nodes of the RF nodal network is greater than throughput saturation of the RF nodal network. The method also involves receiving, by the gateway, test packets. The method also involves forwarding, by the gateway, the received test packets to a server for network performance analysis and in response to forwarding the received test packets, receiving at the gateway updated parameter settings from the server. The updated parameter settings optimize performance of the nodes of the RF nodal network to attain the target network performance metric. The method further involves transmitting, by the gateway, the updated parameter settings to the nodes of the RF nodal network.

An example of a method involves generating, by a server, control packets to be transmitted via a gateway to a RF nodal network of the nodes. Each of the control packets set a parameter of each node in the RF nodal network to an initial parameter setting. The initial parameter setting configures each of the nodes to perform at a level intended to enable the RF nodal network to meet a target network performance metric. The server is coupled to the gateway, and each node in the RF nodal network is an RF device. The method also involves generating, by the server, a number of test packets to be transmitted via the gateway to the network of the nodes. The number of test packets transmitted is greater than throughput saturation of the RF nodal network and each of the test packets set each node in the RF nodal network to a parameter setting different from the initial parameter setting. The method also involves receiving, by the server, via the gateway, test packets. The method further also generating, by the server, a plurality of network performance metrics based on analyzing of the received test packets and comparing, by the server, each of the plurality of network performance metrics with the target network performance metric. The method further involves updating, by the server, the parameter setting of the nodes based on comparison.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

To provide improved performance optimization in a nodal network, e.g. a radio frequency (RF) ad hoc wireless mesh network of a lighting system or the like, the present disclosure includes a system and method for experimentally determining parameter settings for packet-switched broadcast nodes in the RF nodal network that optimize network performance (e.g., client data throughput) for the RF nodal network.

Figure 1:
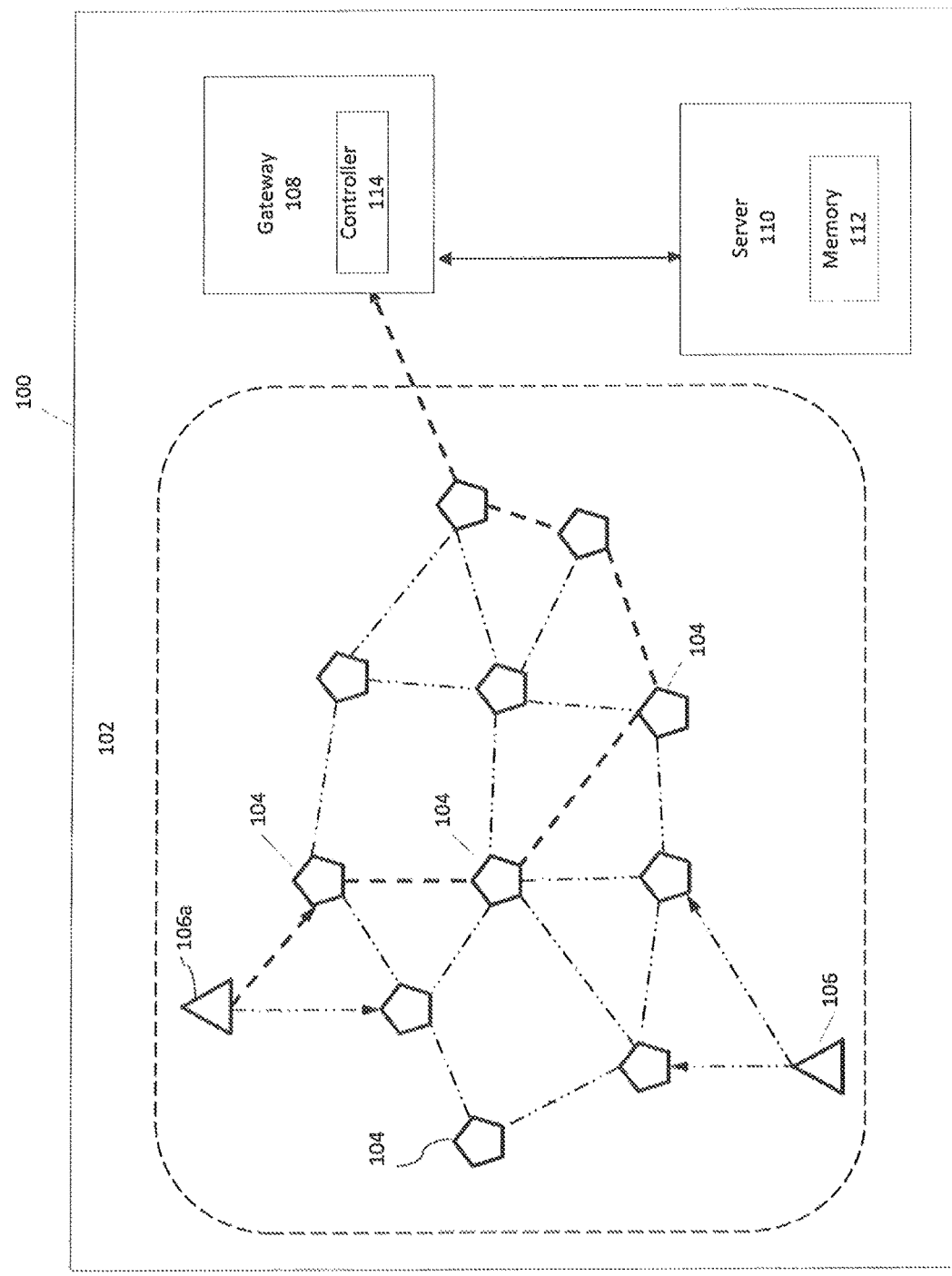
FIG. 1 illustrates a system implementing heuristic optimization of performance of a RF nodal network.

Referring to FIG. 1, there is illustrated a system architecture 100 including a RF nodal network 102, as well as a gateway 108 and a server 110. In one implementation, a gateway is a relatively high bandwidth device that is in communication with both the RF nodal network 102 and the server 110. In one implementation, a server is a computing device configured to generate and process data. In one implementation, the server 110 generates packets as the data to be sent to the RF nodal network 102 via the gateway 108. The gateway 108 is coupled to the server 110 via a data network (such as the public Internet, a proprietary local area network, or the like) not shown. The RF nodal network 102 includes network nodes (nodes) 104. A network node is a connection point in a network that can receive, create, store and/or send data along distributed network routes within the RF nodal network 102. Each network node has a capability to receive, recognize, process and forward transmissions to other network nodes or outside the network. In one example, the nodes 104 are in the form of broadcast RF devices as described in more detail with respect to FIGS. 5-7 below. An example of an RF device may be an electronic device used to transmit and/or receive radio signals between two other devices, such as nodes 104. In another example, the nodes 104 are Bluetooth low energy (BLE) equipped devices as describe in detail with respect to FIGS. 6-7 below. A BLE equipped device may be a wireless network technology designed to provide wireless communication with reduced power. Each node 104 is capable of scanning for or receiving packets or transmitting packets at different times such that the receiving and transmitting does not occur simultaneously. A packet is a unit of data that is routed from one point on the network to another point on a network.

In one implementation, a node is configured to receive a packet when the node in the RF nodal network 102 is in the receive mode. In one implementation, a node is configured to transmit a packet when the node in RF nodal network 102 is in the transmit mode. In one implementation, a number N of the nodes 104 are selected to transmit packets for transport by the RF nodal network 102. The nodes 104 selected to transmit packets are client nodes 106a and 106b. FIG. 1 illustrates two client nodes 106a and 106b, although there may be any number of client nodes in the RF nodal network 102. In one implementation, the gateway 108 includes a controller 114, which functions to identify or select the two client nodes 106a and 106b.

In one implementation, the transmitted packets traverse the RF nodal network 102 carrying data from one point in the network to another point in the network. The packets include a header portion and a main portion. The header portion contains information about the packet including the source and destination, timestamps, network hops, etc. The main portion of the packet contains the actual data being transferred, which is often called referred to a payload. Packets are generally assigned to a queue to be transmitted from the transmitting node into the network.

In one implementation, the number of network node(s) in the RF nodal network 102 selected to be configured as client nodes is based on throughput saturation of the RF nodal network 102. The throughput saturation is a measure of the amount of information/data that is successfully traversed in a network in a given time. In one implementation, nodes are selected and configured as client nodes 106a and 106b at locations of the RF nodal network 102 where the packets transmitted by the client nodes 106a and 106b are able to traverse through as many of the other nodes 104 in the RF nodal network 102 as possible before reaching a gateway 108. In one example, the client nodes 106a and 106b as illustrated in FIG. 1 are placed at a periphery of the RF nodal network 102 since throughput tends to be most constrained for client nodes 106a and 106b whose packets must make the greatest number of hops (i.e. node-to-node transfers) to reach the gateway 108. In one implementation, the client nodes 106a and 106b are physically placed in the RF nodal network 102 such that a distance between the client node 106a or the client node 106b and the gateway 108 is greater than the distance between the nodes 104 and the gateway 108.

In one implementation, each of the packets transmitted by the client nodes 106a and 106b includes a field with a packet-specific identifier unique to that packet. In one implementation, the packet-specific identifier includes a source address, which uniquely identifies each of the client nodes 106 and 106b and a sequence number which uniquely identifies the packet. As such, the server 110 is able to identify the client nodes 106a and 106b of the packets and the packet itself, which successfully traversed the network. In one implementation, the controller 114 divides a number of packets to be transmitted into subdivisions of packets among each of the client nodes 106a and 106b, so that each client node 106a and 106b can transmit its portion of the overall intended number of packets. Each of the packets in the subdivision of the packets are assigned a unique number from a sequence of numbers and further one of the subdivisions is assigned to a respective node of the client nodes for transmission. As such, each of the packets transmitted by each of the client nodes 106a and 106b includes a sequence number, which is unique to the packet, among the sequence of numbers, which is unique to the client nodes 106 and 106b.

In one example, a first client node 106a has a first source address and assigns packets with a sequence number between 0 to 499. Each of the packets transmitted by the first client node 106a includes a different sequence number in the range of sequence numbers between 0 to 499. As such, each of the packets transmitted by the first client node 106a includes the first source address as a common source address and a different sequence number between 0 to 499. In another example, a second client node 106b has a second source address and assigns packets with sequence number between 500 to 999. Each of the packets transmitted by the second client node 106b includes a different sequence number among a sequence number ranging between 500 to 999. As such, each of the packets transmitted by the second client node 106b includes the second source address as a common source address and a different sequence number between 500 to 999.

In one implementation, the server 110 includes a memory 112, which stores parameter settings of the RF nodal network 102. (including optimal settings, if determined), Such parameter settings may include, but not limited to, network topology information, total number of nodes, location of the nodes, time period, network performance metrics and node parameters. In one implementation, the server 110 sets node parameters, which are identical for all the nodes 104 in the RF nodal network 102. In one implementation, the server 110 sets the node parameters, which are unique to each individual node. The node parameters may be unique to one or more nodes based on several variables. Such variables may include but not limited to performance reliability of the node, location of the node, priority level of the packet traversing through the node, and priority level of the node. Some of the node parameters include but are not limited to retransmission time, scan window, time interval, beacon advertisement and transmission interval. Details of each of these parameters are provided herein below.

Figure 2A:
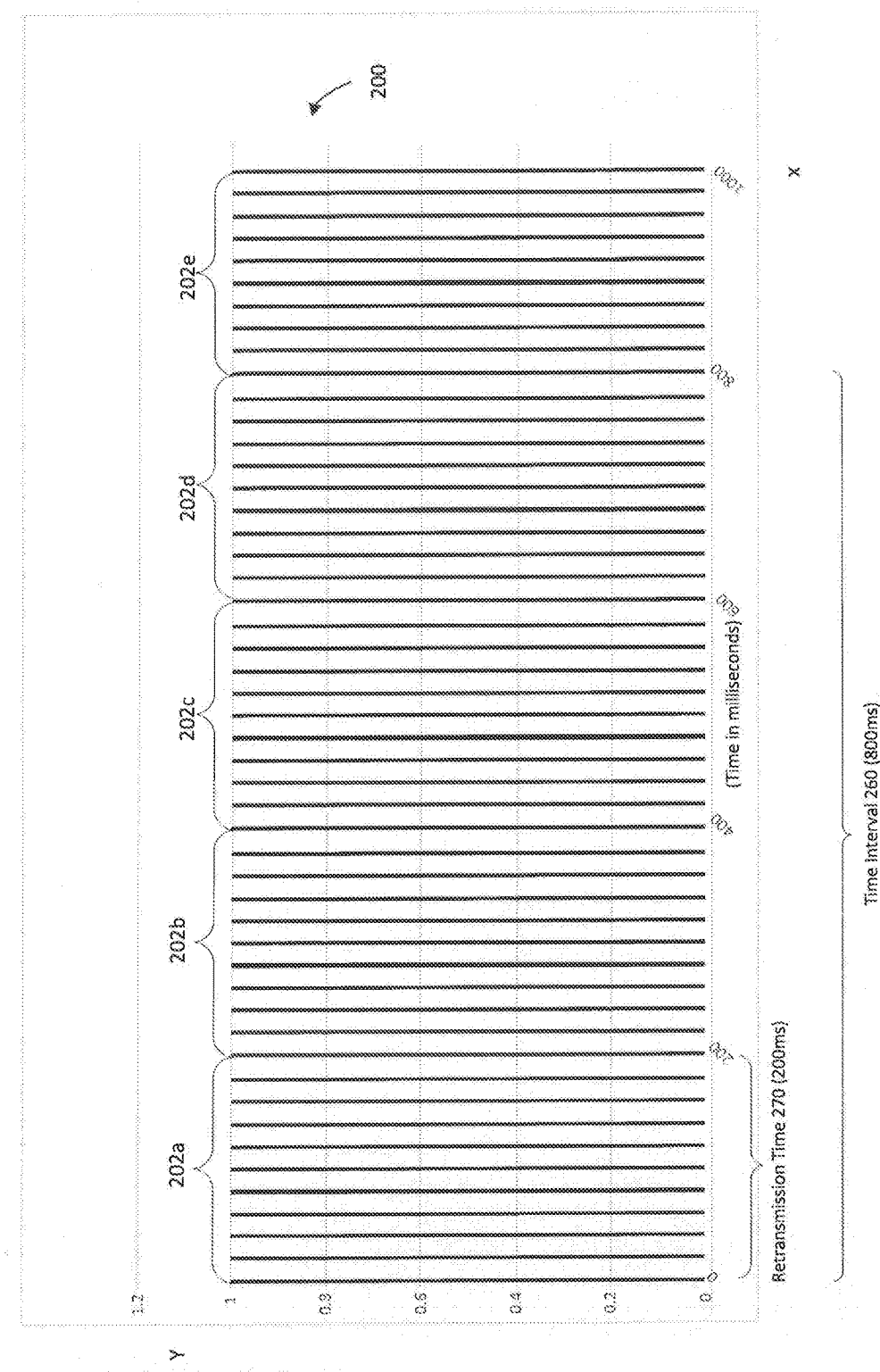
FIG. 2A illustrates example of graphical representations of packet transmissions in the RF nodal network.
Figure 2B:
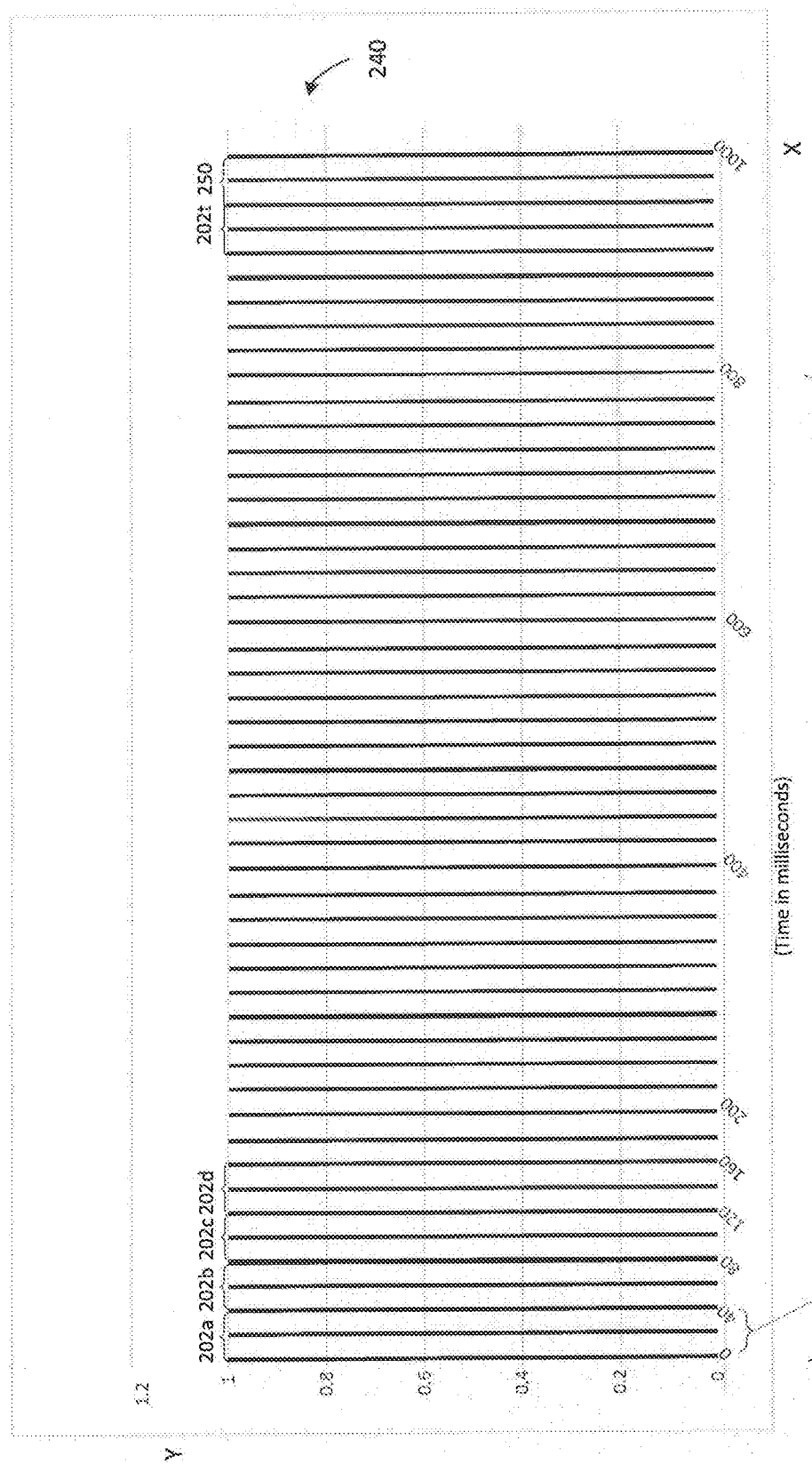
FIG. 2B illustrates another example of graphical representations of packet transmissions in the RF nodal network.

Each of the nodes 104 in the RF nodal network 102 receives packets in a receive mode and transmits packets in a transmit mode. A retransmission time is amount of time a node 104 spends rebroadcasting a received packet in the RF nodal network 102. A time interval is amount of time the node 104 is in the receive mode in between the transmission modes. In one example, during the receive mode, the node 104 receives the packet. In another example, during the receive mode, the node 104 may not receive the packet. A scan window is the amount of time in the time interval in which the node 104 actually receives the packets. In one example, the scan window is less than the time interval such that the node 104 does not receive the packets all the time when the node 104 is in a receive node. In another example, the scan window is equal to the time interval such that the node 104 receives the packets all the time when the node 104 is in a receive mode. A beacon advertisement provides a location information in the RF nodal network 102. Each node broadcasts its own specific location information via the beacon advertisement in a beacon signal. Such beacon signals do not traverse the RF nodal network 102 and are advertised indiscriminately so that a device in an area serviced by the RF nodal network 102 is able to receive these beacon signals. Such device may include an asset tag, a smart phone, computers, smart watches, smart sensors (such as temperature sensor, occupancy sensor etc.). As such, the device determines its own location in the area with respect to the location of the node sent by the beacon advertisement in the beacon signal. In one example, each of the nodes 104 is placed in one or more light fixtures in the area and accordingly, the device is able to determine its own location with respect to the location of the light fixtures. In one implementation, the beacon signals are sent out periodically by the nodes 104 in the RF nodal network 102. The beacon signals are scheduled to be placed in a queue such that node 104 does not transmit packets in the RF nodal network 102 when the node 104 transmits beacon signals to the device. As such, the packets are not transmitted simultaneously as the transmission of the beacon signals. In one implementation, the node 104 receives packets when the node transmits 104 beacon signals. A transmission interval is amount of time spent to scan between the beacon advertisements, i.e. time difference between each beacon advertisement. As such, the transmission interval is duration of time that the packets are transmitted from the node 104. In one example, the retransmission time is 200 ms, a beacon advertisement takes ¼ of the 200 ms, i.e. 50 ms, and transmission interval is 20 ms and the beacon advertisement is ¼ of the In one implementation, a scan window for a node 104 (configured to scan (listen) for packets) is M microseconds and to re-transmit each non-consumed packet R times (Rt microseconds per transmission) during a time interval of T microseconds. FIGS. 2A and 2B illustrate examples of graphical representations 200 and 240 respectively of packet transmissions in the RF nodal network 102. Specifically, FIGS. 2A and 2B illustrate examples of graphical representation of different number of packet transmissions in a time interval. The y-axis illustrates different set of packets 202 including the location packet 250 providing location of the node based on the beacon advertisement and the x-axis illustrates the time interval (T) 260 between transmission of the location packets 250. As discussed above, each node broadcasts its own specific location information via the beacon advertisement in a beacon signal. Accordingly, a node receiving the beacon advertisement can approximate their position in the area based on a node's location advertisement received with strongest signal strength. As shown, in FIGS. 2A and 2B, the location packet 250 is sent out every 800 ms. FIG. 2A illustrates retransmission time 270 as 200 ms and FIG. 2B illustrates retransmission time 270 as 40 ms. As discussed above, a retransmission time is an amount of time a node spends rebroadcasting a received packet. As shown in FIG. 2A, illustrates four different set of packet as first set of packets 202a, second set of packets 202b, third set of packets 202c, and fourth set of packets 202d. In the example of FIG. 2A, during a T=800 ms long, a node 104 rebroadcasts every 200 ms (retransmssion time). As such four sets of packets (i.e. 202a, 202b, 202c, 202d) are rebroadcast during the T=800 ms, which is followed by the location packet 250. In another example of FIG. 2B, during the T=800 ms, a node 104 rebroadcasts every 40 ms (retransmission time). As such, twenty sets of packets i.e. (202a-202t) are rebroadcast during the T=800 ms, which is followed by the location packet 250. In one implementation, longer scan time (scan window) increases the probability of packet reception by a node 104 but decreases the number of retransmissions of the packets possible in a given time interval. In another implementation, increase in number of packet repeat transmissions increase the probability of successful packet broadcast, but also decreases network bandwidth because more transmit opportunities are consumed by repeats. Accordingly, an actual network performance will tend to depend on these and other node parameters and hence a need for an experimental method of optimizing network performance metric. In one implementation, the packets are control packets generated by the server 110. A control packet includes routing and scheduling information of the packets. In one implementation, the control packets function to configure or set the node parameters of each of the nodes 104 to an initial parameter setting. As discussed above, the node parameters include but are not limited to retransmission time, scan window, time interval, beacon advertisement and transmission interval. The initial parameter setting configures each of the nodes 104 to perform at a level intended to enable the RF nodal network 102 to meet a target network performance metric. In one implementation, the network performance metric is based on several various factors. In one example, the factor is a bandwidth of the network 102, i.e. total number of packets transmitted in the network at a given time. The transmission of the packets in the network include packets transmitted from one end of the network 102 to a specific node 104 or the gateway 108. In another example, the factor is receipt of a single packet by every node 104 on the network 104 without skipping or around the node. Such example is useful in lighting control such as none of the nodes (lights) are skipped and all the nodes (lights) in the network receive the dimming message. In another example, the factor is bandwidth of each of the nodes 104, i.e. number of packets received by the node at a given time. In a further example, the network factor is a bandwidth of each of the client node 106, i.e. number of packets transmitted by the client node at a given time. In an even further example, the factor is a schedule of the location beacon advertisements. Some location beacon advertisements are scheduled to be sent more often while others are scheduled to be sent less often. In one implementation, sending location beacon advertisements less often will increase the number of network packets through the network, but may decrease location accuracy of the node.

The control packets are transmitted to the gateway 108 to be propagated through the RF nodal network 102. In one implementation, the gateway 108 includes a controller 114, which instructs the control packets to propagate through the RF nodal network 102 to set the node parameters. A controller is a communications protocol that controls the transmission of the packets from the server 110 to the RF nodal network 102. In another implementation, the control packets function to alter parameters of the nodes 104 as described in detail below.

In one implementation the control packets are prioritized to be transmitted through the gateway 108. The server 110 may prioritize the control packets by determining a sequence of the transmission of the control packets into the RF nodal network 102. In one implementation, the control packets are prioritized based on a type of packet. Such types of packets may include but not limited to lighting control packets, indoor positioning packets and asset packets. In one implementation, the server 110 sets the node parameters in real time based on prioritized hierarchy of tasks or modes of the packet. For example, the control packet is a lighting control packet and the task/modes of the lighting control packet include emergency lighting control and time of day dimming lighting control. The emergency lighting control task will be prioritized time of day dimming control, accordingly, the control packet with the task to control the emergency lighting will be prioritized over the control packet with the task to dim lighting control such that the control packet with the task to control emergency lighting will be scheduled to transmit into the network prior to transmitting the control packet with the task to dim light control. In another example, the control packet is a sensor data packet and the task of the sensor data packet includes collecting temperature reading of an area of the network.

In one implementation, a machine learning algorithm sets the node parameters based on some test(s) that have been conducted in the RF network 102 prior to real time. The machine learning algorithm sets the node parameters in an initial time and updates the parameters until an optimal network performance is achieved. In another implementation, the machine learning algorithm conducts test(s) in another network with similar installation of the RF network 102 and optimizes the parameters to achieve the optimal network performance. Such installation may include but not limited to topology, number of nodes, network use etc. In one implementation, the machine learning algorithm functions to optimizes the network performance in real time. Specifically, the node parameters are set in real time based on a machine learning algorithm. The machine learning algorithm determines the node parameters based on topology of the network, location of the nodes, number of nodes in the network, network utilization (e.g. lighting, temperature sensor, occupancy sensor etc.). The machine learning algorithm may optimize the network by adding nodes in the network in real time. The machine learning algorithm may optimize the network by removing nodes in the network in real time. The machine learning algorithm may optimize the network by altering the node parameters in real time. Accordingly, the server 110 may utilize the machine learning algorithm to optimize the network performance in real time. The successful test packets are further transmitted to the server 110 for processing as described in detail below.

In one implementation, the server 110 stores and analyzes each of the successfully received test packets corresponding to each of the plurality of tests to determine a performance of the network. In one implementation, the number of test packets successfully received is less than a total number of the transmitted test packets. The server 110 generates a plurality of different network performance metrics based on analyzing of the successfully received test packets corresponding to each test among the plurality of tests. As discussed above, a plurality of tests packets corresponding to each test among the plurality of tests configure the nodes to node parameters in the parameter settings. Also, as discussed above, the node parameters in the parameter settings vary in each test. In one implementation, the server 110 generates the network performance metric for each test based on the node parameters configured for that test. In another implementation, the server 110 generates the network performance metric based on various combinations of node parameters from two or more tests. One combination for example may include three parameters from the first test and two parameters from the second test. Another combination, for example may include two parameters from the first test, one parameter from the second test and one parameter from the third test. Accordingly, many different network performance metrics are generated.

In one implementation, the network performance metric is a bandwidth of the network 104, i.e. total number of packets transmitted in the RF nodal network 102 at a given time. The server 110 calculates various bandwidths of the RF nodal network 102 based on the node parameters of the parameter settings of successfully received test packets corresponding to each test among the plurality of test. In one example, a test in conducted in the RF nodal network for a given set of node parameters. The number of test packets for the test is received at the gateway 108 at a given time i.e. the number of seconds between the first packet being received and the last packet being received at the gateway 108 equals to a number of packets received per second. Based on the results of the test, the one or more node parameters in the set of node parameters are then changed, and another test is conducted to calculate the bandwidth using the changed set of node parameters.

In one implementation, the server 110 compares each of the different network performance metrics (results from tests) with one another and determines which network performance metric resulted in the target performance metric. As discussed above, the network performance metric is based on various factors. In one example, the factor is the bandwidth of the RF nodal network 102 (number of packets per a specific time), the server 110 may determine a network performance metric among the different network performance metrics to be the target network performance metric when the bandwidth associated with the network performance metric is largest in value than all the other bandwidths associated with other network performance metrics. In another implementation, the network performance metric is based on a single factor. In a further implementation, the network performance metric is based on combination of factors. In such implementation, weights are assigned to all the factors of the network performance metric and server 110 would select the factor which provides the largest weight for the comparison discussed above. In one implementation, the server 110 updates/alters the node parameters in the RF nodal network 102 with the node parameters corresponding to the network performance metric that is determined to be the target network performance metric, which is associated with a test among the plurality of tests Specifically, the server 110 generates another set of control packets with updated parameter settings including the updated/altered node parameters. These another set of control packets are different from the control packets generated with initial parameter settings. The another set of control packets with the updated parameter settings are transmitted to the gateway 108 to be propagated through the RF nodal network 102 to configure all the nodes 104 to the updated parameter settings. The server 110 then generates another set of test packets for a test among the plurality of tests to be transmitted into the RF nodal network 102 based on the updated parameter settings. These another set of test packets are different from the test packets previously generated after the control packets with the initial parameter settings. As such, a plurality of control packets and corresponding test packets are generated and transmitted into the RF nodal network 102 until it is determined that the parameter settings of the RF nodal network 102 meet the target performance metric. In one implementation, a set of control packets and corresponding set of test packets are independent from the another set of control packets and corresponding another set of test packets. In one implementation, the server 110 may determine that value of none of the different network performance metrics are approximately equal to a value of the target network performance metric. As such, it is determined that there is no need to update the node parameters of the network and the current parameter settings of the network meet the target performance metric.

Figure 3:
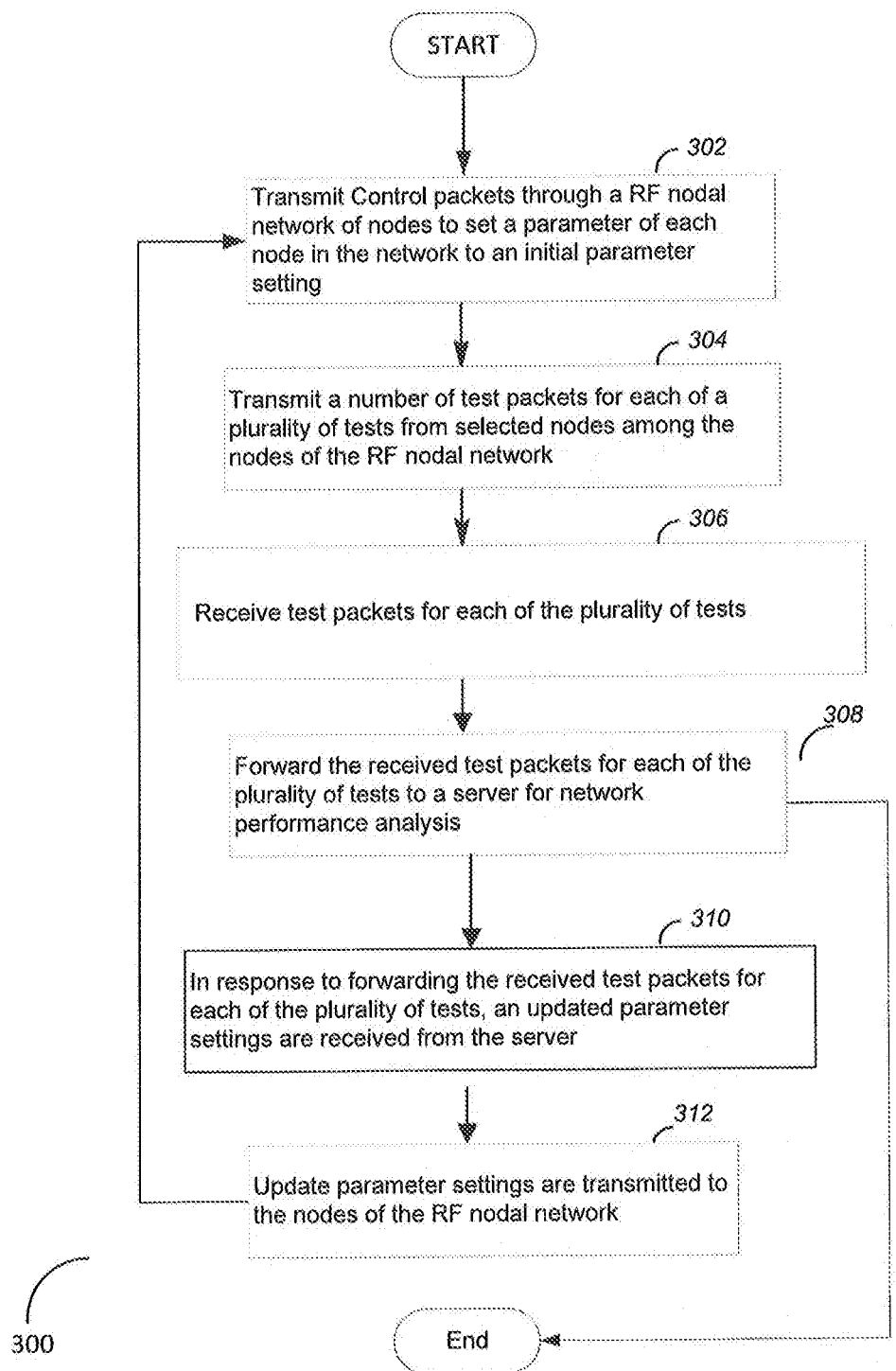
FIG. 3 is a flowchart of an example of a process for heuristically optimizing performance of the RF nodal network.

FIG. 3 is a flowchart of an example of a method 300 for heuristically optimizing performance of the RF nodal network. In one implementation, the method 300 is implemented by the gateway 108 of FIG. 1.

At block 302, control packets are transmitted through a RF nodal network of nodes to set a parameter of each node in the network to an initial parameter setting. As discussed above, some of the node parameters include but are not limited to retransmission time, scan window, time interval, beacon advertisement and transmission interval. In one implementation, the initial parameter setting configures each of the nodes to perform at a level intended to enable the RF nodal network to meet a target network performance metric. In one implementation, each node in the RF nodal network is an RF device. As discussed above, the control packets are generated by a server that is coupled to the gateway via the WAN network. At block 304, a number of test packets for each of a plurality of tests are transmitted from selected nodes among the nodes of the network. As discussed above, the test packets are generated by the server and sent to the gateway to be transmitted into the RF nodal network to run tests in the network by configuring the nodes to parameter settings that are different from the initial parameter settings. In one implementation, a number of the nodes are selected based on throughput saturation of the RF nodal network. In one implementation, the number of network test packets that are transmitted by the selected nodes is greater than the throughput saturation of the network. As discussed above, the throughput saturation is amount of information/data a network can transmit in a given time. In one implementation, the number of test packets are divided into subdivisions of test packets among each of the selected nodes and each test packet in the subdivision of test packets is assigned with a unique number from a sequence of numbers. Also, one of the subdivisions are assigned to respective node of the selected node for transmission.

At block 306, test packets for each of the plurality of tests are received. In one implementation, the received test packets are the test packets that successfully traversed the RF nodal network. In one implementation a number of successfully received test packets for each of the plurality of tests are less than the number of transmitted test packets for each of the plurality of tests. As discussed above, the number of test packets transmitted from the nodes is greater than the throughput saturation of the network. In one implementation, the gateway is always in a mode to receive the packet and so is capable of receiving as many packets as are generated in the network (up to some much higher limit of hardware/software capabilities of the gateway). At block 308, the received test packets for each of the plurality of tests are forwarded to a server for network performance analysis. At block 310, in response to forwarding the received test packets for each of the plurality of tests, an updated parameter settings are received from the server. In one implementation, the updated parameter settings optimize performance of the nodes of the RF nodal network to attain the target network performance metric. At block 312, the updated parameter settings are transmitted to the nodes of the RF nodal network. In one implementation, control packets are generated with updated parameter settings to be transmitted to the nodes of the RF nodal network to update the parameter of each of the nodes in the network with the updated parameter settings. In one implementation, method 300 is repeated for different parameter settings until it is determined that the current parameter settings of the RF nodal network meet the target network performance metric. In another implementation, the method 300 ends after block 308 after the received test packets for each of the plurality of tests are sent to the server for network performance analysis. As such, when no further updated parameter settings are received in response to forwarding the received test packets. Accordingly, in this implementation, it is determined that the current parameter settings of the RF nodal network meet the target network performance metric.

Figure 4:
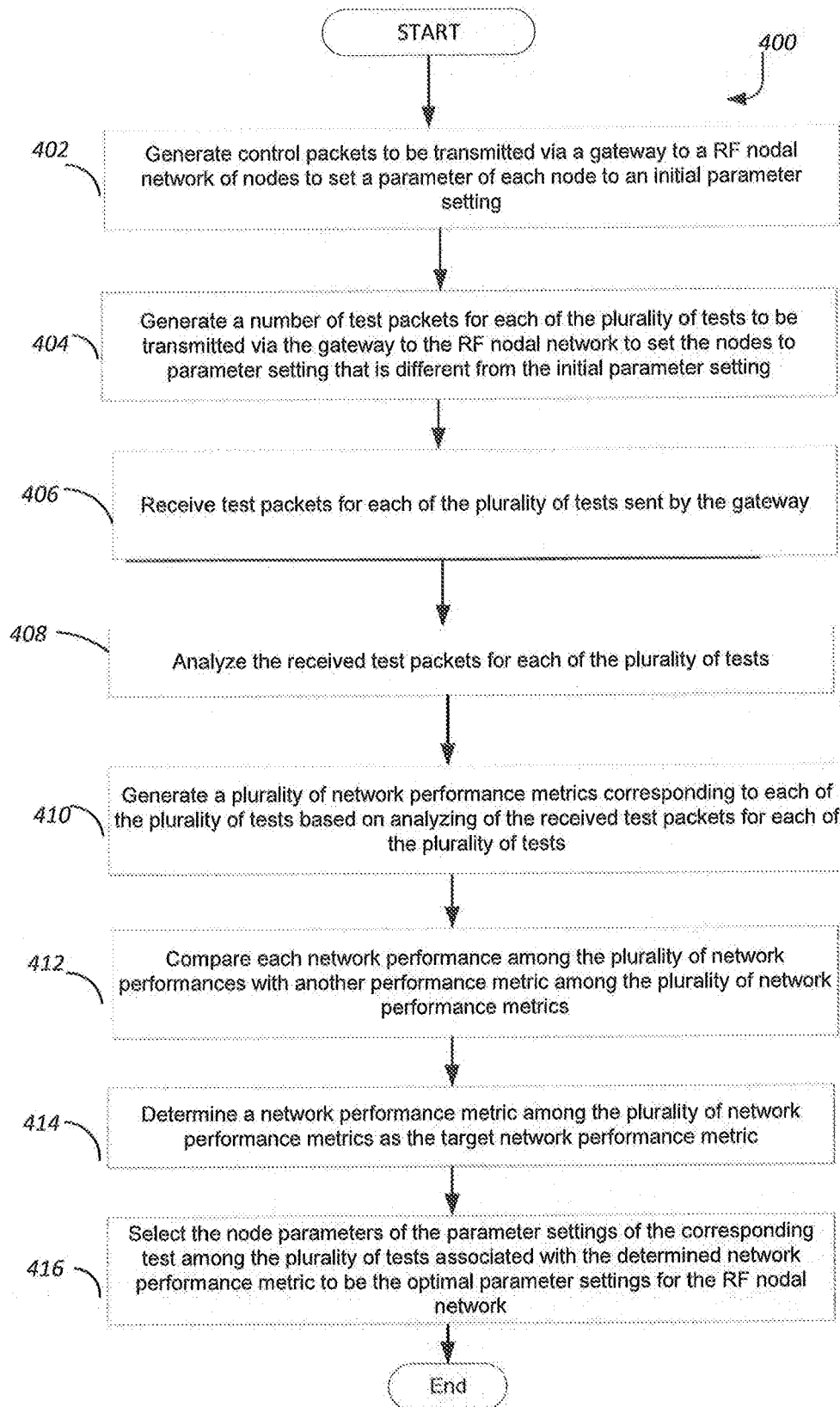
FIG. 4 is a flowchart of another example of a process for heuristically optimizing performance of the RF nodal network.

FIG. 4 is a flowchart of an example of a method 400 for heuristically optimizing performance of the RF nodal network. In one implementation, the method 400 is implemented by the server 110 of FIG. 1.

At block 402, generate control packets to be transmitted via a gateway to a RF nodal network of nodes to set a parameter of each node in a network to the initial parameter setting. In one implementation, the initial parameter setting configures each of the nodes to perform at a level intended to enable the RF nodal network to meet a target network performance metric. In one implementation, each node in the RF nodal network is an RF device. At block 404, generate a number of test packets for each of the plurality of tests to be transmitted via the gateway to the RF nodal network of nodes to set the nodes to parameter setting that is different from the initial parameter setting. At block 406, receive test packets for each of the plurality of tests. In one implementation, the received test packets are the test packets that successfully traversed the RF nodal network. In one implementation, the number of successfully received test packets for each of the plurality of tests is less than the total number of transmitted test packets for each of the plurality of tests. At block 408, analyze the received test packets for each of the plurality of tests. At block 410, generate a plurality of network performance metrics corresponding to each of the plurality of tests based on analyzing of the received test packets for each of the plurality of tests. As discussed above, the received test packets correspond to each of the tests among the plurality of tests. As discussed above, the network performance metric is generated for each test among the plurality of tests such that the each test correspond to test packets among the number of packets. As discussed above, in one implementation, the server generates the network performance metrics based on node parameters from the parameter settings configured for each specific test among the plurality of tests. Also as discussed above, in another implementation, the server 110 generates the network performance metric based on various combinations of node parameters of two or more tests among the plurality of tests.

At block 412, compare each network performance metric among the plurality of network performance metrics with another network performance metric among the plurality of network performance metrics. As discussed above, the network performance metrics is based on various factors. In one implementation, the network performance metric is based on a single factor. In one example, single factor is the bandwidth (number of packets per a specific time) of the network. In this example, the bandwidth of each of the tests would be compared with one another. Also, as discussed above, the network performance metric is based on combination of the factors. In one implementation, weights would be assigned to all the factors of the network performance metrics corresponding to each of the plurality of tests. The weights of the factors of the network performance metrics corresponding to each of the plurality of tests would be compared with weights of the factors of the network performance metrics corresponding to another of the plurality of tests. At block 414, determine a network performance metric among the plurality of network performance metrics as the target network performance metric. In one example, the network performance metric is based on a single factor, bandwidth. As such, the bandwidth corresponding to a test among the plurality of tests is to be optimal when the bandwidth of the test has highest value than all the other bandwidths associated with other tests among the plurality of tests. In another example, the network performance metric is based on combination of factors. As such, the network performance metrics corresponding to a test among the plurality of tests having the weight of the combined factors with the largest value would be selected as the target network performance metric. At block 416, the node parameters of the parameter settings of the corresponding test among the plurality of tests associated with the determined network performance metric is selected to be the optimal parameter settings for the RF nodal network.

Figure 5:
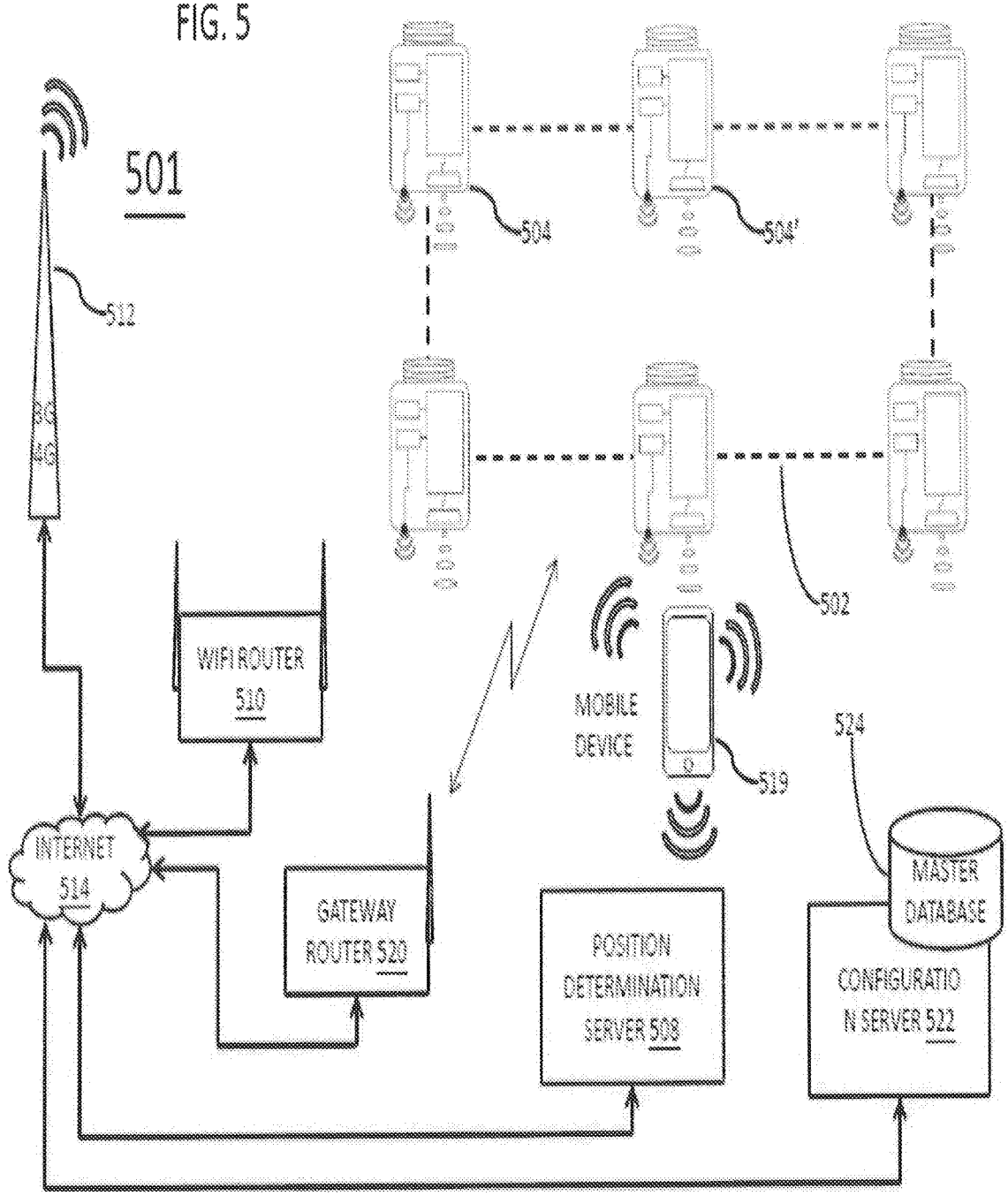
FIG. 5 depicts a system of lighting devices and network connected resources, wherein the lighting devise are arranged in an ad hoc wireless mesh-type network.
Figure 6:
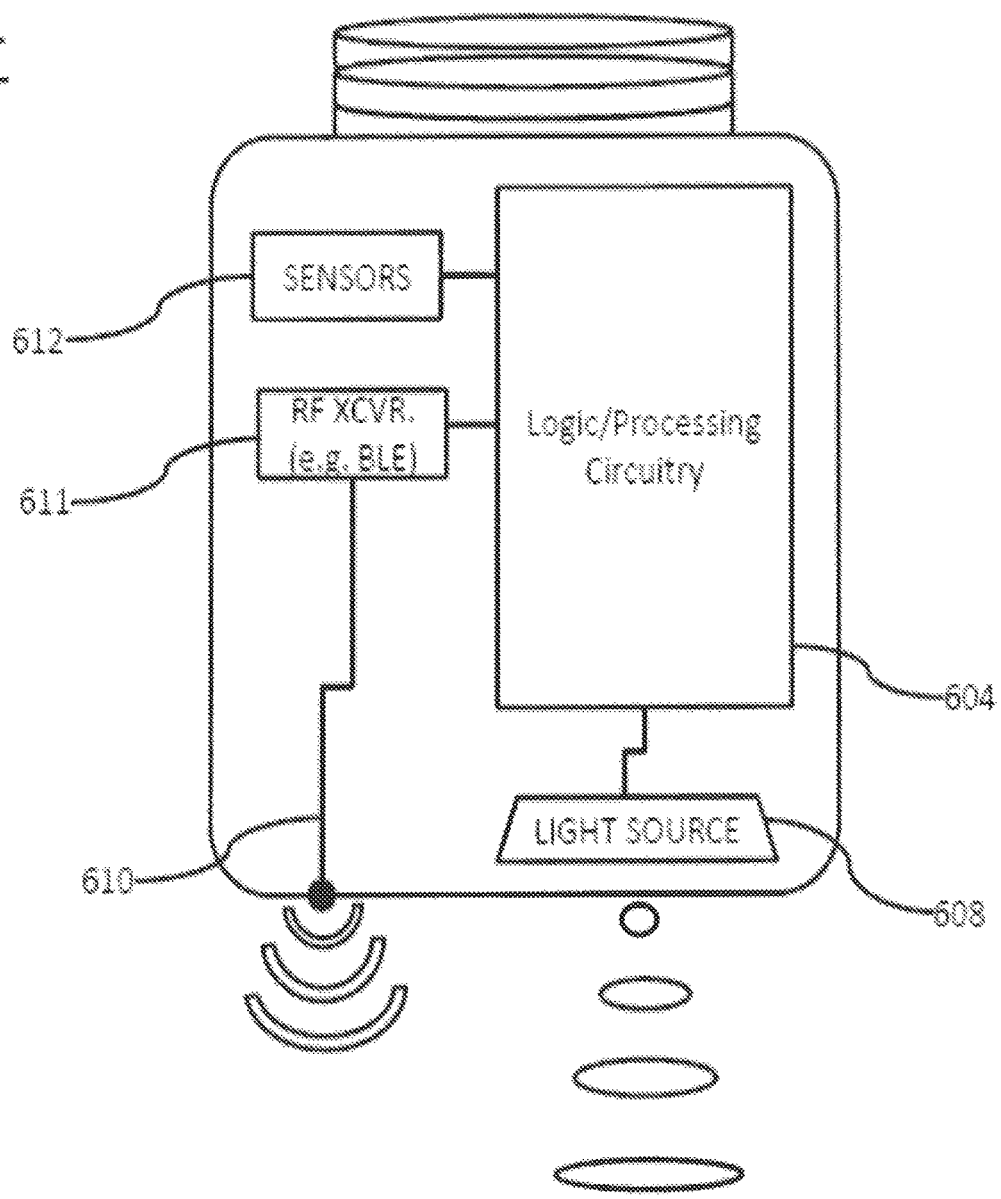
FIG. 6 depicts a simplified block diagram of an RF-enabled lighting device that may be used in system of FIG. 5.
Figure 7:
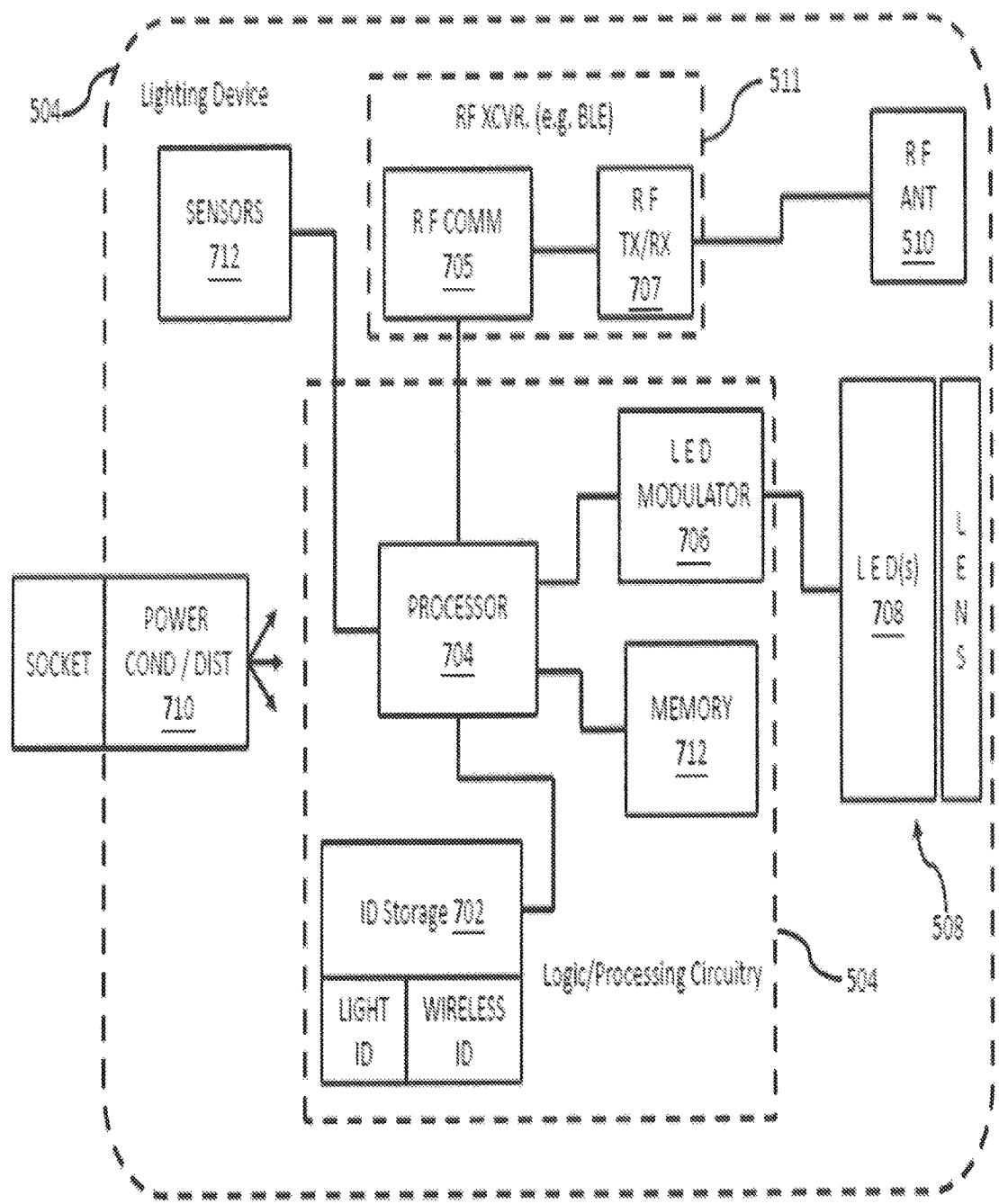
FIG. 7 depicts a more detailed functional block diagram of an example of the lighting device of FIG. 6.

FIGS. 5, 6 and 7 as discussed herein below are implementations of a system of lighting devices that is configured to implement the functional examples described with respect to FIGS. 1-4 as discussed above.

FIG. 5 depicts a configuration of RF enabled modulatable lighting devices arranged in an ad hoc mesh-type network 502 and connected to Internet resources through a nearby gateway router 520. Although not shown, the ad hoc mesh-type network 502 may alternatively be temporarily connected to Internet resources through a nearby mobile device. Modulatable lighting devices 504 may be configured so that a modulated light signal provided from the light emitted from each device 504 may be distinguished from modulated light signals produced by other nearby lighting devices 504 as well as from light outputs from other unmodulated sources or lighting devices (not shown). When such modulating lighting devices 504 are configured with RF capability and form a wireless network they may communicate configuration information from lighting device to lighting device.

A network capability as depicted in FIG. 5 may include access through a mobile device or other RF enabled device to external (non-mesh) networks. In an example where the mobile device temporarily serves as the gateway, software installed on a mobile device that is in contact with a non-mesh communications network (e.g., an app voluntarily installed on a smart phone that is connected to the Internet via WiFi and/or to a cell phone network) facilitates the mobile device to act as a network-to-network gateway. In the example, however, the system 501 includes another suitable network-network gateway 520 installed in the vicinity of one or more of the lighting devices 504 of the system. A network-network gateway 520 in close proximity to one of the networked lighting devices 504 may enable communication from at least one of the lighting devices and thus the network 502 through any suitable wireless networking link such as Ethernet, Zigbee, and the like.

In the example of FIG. 5, a mobile device that may have Bluetooth and WiFi and/or cellular communication capabilities may act as a gateway for communicating data to/from RF enabled, light modulatable lighting devices. If the lighting devices are configured into a network 502 with access via a gateway such as gateway router 500, it may be possible for an Internet resource, such as a position determination server 508, to communicate to a networked lighting devices 504 or 504' by passing data through the Internet 514. This may allow communication of information collected from mobile devices via the RF capability (e.g., identities of devices/users that pass through the area) by one of the lighting devices to a remote server, such as server 508.

Use of mobile devices as gateways between a VLC+RF system and another network (e.g., wireless mesh) may be opportunistic: e.g., mobile devices of customers who have installed an app related to the VLC+RF mesh may be opportunistically enlisted as gateways as the devices move in and out of the mesh's working space. Such a gateway function may be used, for example, to effectively increase the bandwidth of data reporting by mesh nodes to a server/controller, since under various conditions packets can be communicated more quickly through a gateway than through a series of mesh-node retransmissions. Gateway transmission may be used alternatively or additionally to transmission through a mesh controller node connected to a non-mesh network: e.g., upon failure of an external-connection node or device, a mesh may still be enabled to communicate with a server/controller device acting a gateway, carrying on its various functions while calling for diagnosis and repair of the failure.

In various examples, the position determination server 508 is a general-purpose mesh server and controller (back end) that performs functions other than or additional to position determination, issuing commands to the RF and/or lighting capabilities of one or many network nodes, polling network nodes for information garnered from sensors, and so on. A general-purpose back end may be enabled to understand the locations, movements, and other aspects of mobile devices and other assets within the service area of the VLC+RF network mesh.

Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of VLC beacons by a light-sensing capability of the mobile device, e.g., after the device user is prompted to expose their device to light based on detection of their presence by the RF mode.

The configuration server 522 may be implemented as additional programming on the some general purpose computer implementing the position determination server 508. Alternatively, the configuration server 522 may be implemented on a separate network connected general purpose computer platform. Either one or both of the servers 508, 522 may be implemented in a distributed fashion on multiple network connected computers, e.g. to adequately serve a particular traffic load and/or to provide some level of redundant capacity for peak load or for use in the event of a failure of a primary server resource. The master database 524 may be implemented in a storage device of the general purpose computer(s) that implements the server 522 or the server 508, or the master database 524 may be implemented in a network connected storage device accessible to the appropriate general purpose server computer(s).

FIG. 6 is a somewhat schematic illustration and a somewhat block diagram type representation of one of the lighting devices 504; and FIG. 7 is a somewhat more detailed functional block diagram showing possible implementations of several elements of the example of the lighting device 504 of FIG. 5. Reference numbers used in common in both these drawings refer to the same items. For convenience, the description of these examples will refer to both drawings together, unless otherwise noted.

The example of a lighting device 504 in FIGS. band 7 includes logic and/or processing circuitry 404 to drive and control operations of a light source 608 and control operations of other elements of the device 504. The light source 608 may be any suitable device capable of generating light in response to power that can be modulated. In the example of FIG. 7, one or more light emitting diodes (LEDs) 708 form the light source 508. The device 504 may include an optical processing element coupled to process the light output from the LEDs 708 that form the light source 508. Although other optical processing elements may be used, such as diffusers, reflectors and the like, the example of FIG. 7 shows a lens.

The logic and/or processing circuitry 604 may include elements such as a secure (possibly encrypted and/or key locked) ID storage 602, a processor 604, a modulator (LED modulator 706 in the example of FIG. 7) to supply and modulate power to the source 608, and a memory 712 as a storage device for programming and data. The secure ID storage 702 may be a separate physical storage device as shown or may be a secure section of the memory 712.

The secure ID storage 702 will store at least one unique source address and a unique sequence number currently assigned to the particular lighting device 504, which the processor 704 uses to control the modulator 706 so that the lighting output from the LEDs 708 carries the assigned unique source address and the assigned unique sequence number. At least in some transitional operations, the secure ID storage 702 may store two lighting device IDs, e.g. a previously assigned source address and the sequence number as well as a newly assigned shifter code stored before replacement/deletion of the previously assigned source address and the sequence number. For RF operations, the lighting device 504 typically will also have one or more wireless ID codes as the unique source address and/or the unique sequence number, which may also be stored secure ID storage 702. Alternatively, a wireless device ID code as the unique source address and/or the unique sequence number may be burned into or otherwise relatively permanently stored in the applicable RF communication circuitry.

Although the light modulation could be optical and coupled to the output of the source 608 so as to vary a characteristic of light output before emission thereof to illuminate the premises; in the examples, the logic and/or processing circuitry 604 varies an aspect of power applied to the light source 608 to modulate the light generation by the source 608. In the LED example of the lighting device 504 shown in FIG. 7, the modulator 706 may be a controllable driver of a capacity appropriate for the number of and type of LEDs 708 that together form the light source 608, where the driver circuit forming the modulator 706 is sufficiently controllable to modulate the light output according to the modulation scheme used by the lighting devices 504 and detectable by the mobile devices 519.

Although purpose built logic circuitry could be used, the processor 704 typically is implemented by a programmable device such as a microprocessor or a microcontroller, configured to execute programs and process data that facilitate modulation of light from one or more LEDs lighting devices 708. The ID storage 702 and memory 712 may be implemented as separate circuit elements coupled to/accessible by the processor 704, e.g. if the processor is a microprocessor type device. A microcontroller typically is a 'system on a chip' that includes a central processing unit (CPU) and internal storage; therefore a microcontroller implementation might incorporate the processor 704, ID storage 702 and memory 712 within the microcontroller chip.

The processor 704 controls the LED modulator 706 to vary the power applied to drive the LEDs 708 to emit light. This control capability may allow control of intensity and/or color characteristics of illumination that the source 608 provides as output of the lighting device 504. Of note for purposes of discussion of position system operations, this control capability causes the modulator 706 to vary the power applied to drive the LEDs 708 to cause code modulation of light output of the light output of the source 608, including modulation to carry a currently assigned source address and the sequence number from the secure storage 702. The processor and/or modulator may be configured to implement any of a variety of different light modulation techniques. A few examples of light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary Manchester encoding (TME) modulation, and digital pulse recognition (DPR) modulation. Other modulation schemes may implement a combination of two or more modulation of these techniques.

As noted, the lighting devices 504 in our examples utilize wireless links to communicate, although other communication media and technologies may be adapted to carry communications discussed herein to and/or from the modulatable lighting devices 504. Hence, our wireless example of FIGS. 6 and 7 includes a radio frequency (RF) wireless transceiver (XCVR) 611 coupled to the logic and/or processing circuitry 604. The transceiver 611 in turn is coupled to an RF transmit/receive antenna 610 that may facilitate communication over wireless RF signals to and/or from other similarly equipped proximal devices, such as other lighting devices 504, mobile devices 518 or 519, wireless gateway router 520 or other wireless routers or relays, wireless enabled computing devices generally, RF equipped items such as appliances, tools, entertainment devices, RF tags, RF enabled network access points, multi-radio devices, and the like. The RF communication capability offered by transceiver 611 and the antenna 610 supports the various data communications of the lighting device 504 discussed herein, including those related to source address and the sequence number assignment.

The RF transceiver 611 may conform to any appropriate RF wireless data communication standard such as wireless Ethernet (commonly referred to as WiFi) or Zigbee. In the example, however, the RF transceiver 611 is a Bluetooth wireless transceiver, more specifically conforming to the Bluetooth Low Energy (BLE) standard. At a still relatively high level, the BLE transceiver 611 may include RF communication circuitry 705 coupled to the processor 704 and RF transmit (TX) and receive (RX) physical layer circuitry 707 coupled to the RF transmit/receive antenna 610.

The lighting device 504 of FIGS. 6 and 7 may further include one or more sensors 612 for detecting aspects of the environment, including electromagnetic emissions from nearby computing devices or others of the lighting devices 504. As another class of examples, the sensors 612 may include one or more feedback sensors for detecting operational parameters of the device 504, such as the temperature and/or intensity or color characteristics of the light outputs of the LEDs 708. The sensors 612 may be connected to the processor 604 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, light intensity sensors, light color characteristic sensors, and the like. While the aforementioned sensor examples are contemplated, so are any other types of sensor that may detect an aspect of an environment into which the lighting device 504 may be deployed.

The lighting device 504 also includes power conditioning and distribution circuitry 710 coupled to receive power from the power mains provided to the lighting device 504, through a socket connection in the example of FIG. 7. The power conditioning and distribution circuitry 710 converts the power from the mains to one or more appropriate forms/levels required by the various electronic components of the lighting device 504 and distributes the converted power to those electronic components. Although deriving power from mains is shown and described for convenience, other power sources are contemplated, such as power over data networking, solar power, battery power, etc.

RF communication capabilities typically comply with some network-like standard, such as Bluetooth in our example. A Bluetooth network standard includes unique identifiers for each Bluetooth device that is connected to a wireless network. In a similar way, each RF enabled modulating light 504 may be configured with a unique RF wireless identifier. This RF wireless identifier may be used when determining a position of a properly equipped personal mobile device (e.g., a personal mobile device 519 with an RF capability, a camera capability, and a mobile device application for interacting with at least these two capabilities). The RF wireless identifiers modulated on the RF signals output by the transceivers 611 and antennas 610 of the lighting devices 504 may be inherent identifiers of the transceivers 611, e.g. wireless node IDs modulated on beacon or pilot channel signals broadcast by the transceivers 611 according to the BLE or other applicable wireless standard. Alternatively, the processors 704 may provide positioning/location system related node IDs to the transceivers 611 for inclusion in broadcast data messages.

Figure 9:
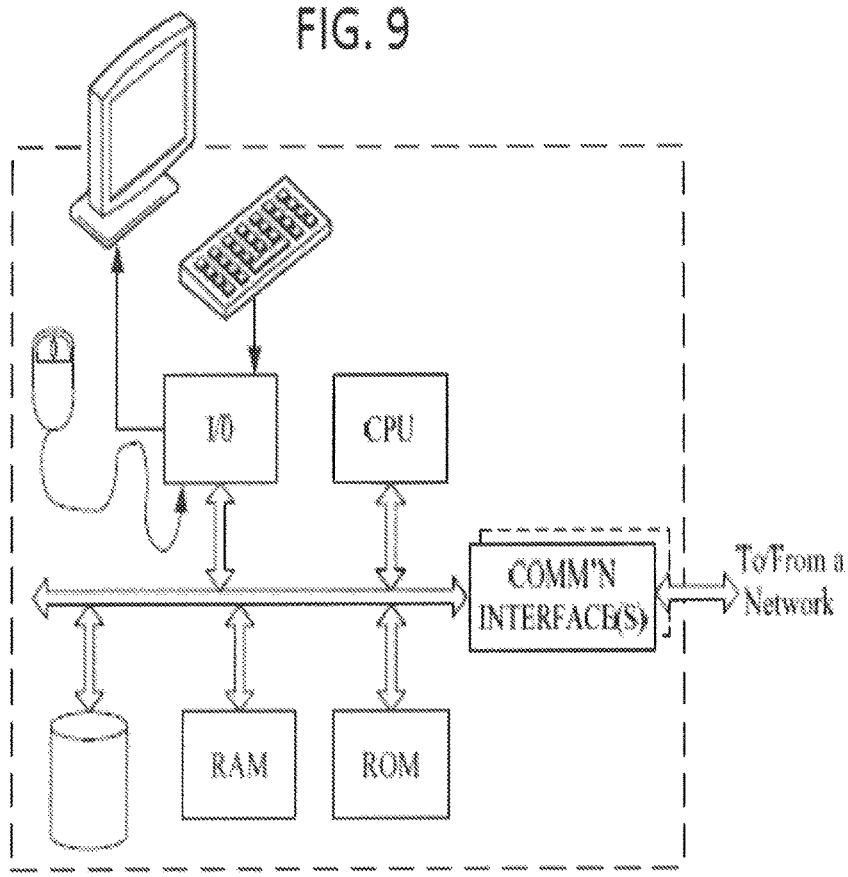
FIG. 9 is a simplified functional block diagram of a computer that may be configured as a processor or server, for example, to function as either of the servers in the system of FIG. 5.
Figure 8:
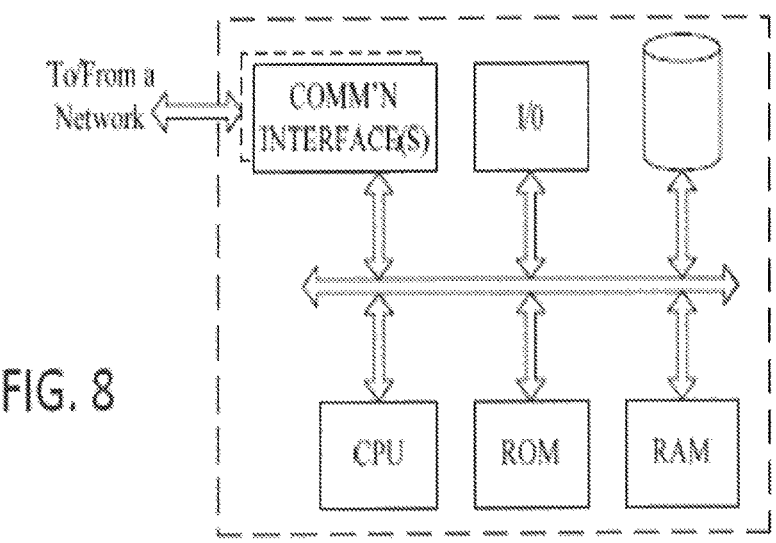
FIG. 8 is a schematic diagram of a number of lighting devices having code modulation and RF wireless communication capabilities.

FIGS. 8 and 9 provide functional block diagram illustrations of general purpose computer hardware platforms configured to implement the functional examples described with respect to FIGS. 1-4 as discussed above.

Specifically, FIG. 8 illustrates a network or host computer platform, as may typically be used to implement a server. Specifically, FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

Hardware of a server computer, for example (FIG. 8), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface, CPU, main memory and one or more mass storage devices for storing user data and the various executable programs (see FIG. 9).

Aspects of the methods of heuristically optimizing performance of a nodal network, as outlined above, may be embodied in programming in (such as described above FIGS. 8 and 9), e.g. in the form of software, firmware, or microcode executable by a networked computer system such as a server or gateway, and/or a programmable nodal device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, from one computer or processor into another, for example, from a management server or host processor into the server 110 or the gateway 108 of the system 100. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine readable medium accessible to a processor of a computer system or device, render computer system or device into a special-purpose machine that is customized to perform the operations specified in the program performed by the server 110 or the gateway 108 of the system 100.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A system comprising:
    a radio frequency (RF) nodal network of nodes, each node including a radio frequency (RF) device;
    a gateway coupled to the RF nodal network, wherein the gateway is configured to transmit through the RF nodal network, control packets that set a parameter of each node in the RF nodal network to an initial parameter setting, wherein:
        the initial parameter setting configures each of the nodes to perform at a level intended to enable the RF nodal network to meet a target network performance metric; and
        nodes among the network of nodes are selected and together configured to transmit test packets for each of a plurality of tests to traverse the RF nodal network based on a throughput saturation of the RF nodal network such that a number of the test packets transmitted by the selected nodes is greater than the throughput saturation of the RF nodal network;
    wherein upon receipt of the test packets, the gateway is to forward the received test packets for each of the plurality of tests to a server; and
    the server coupled to the gateway to receive the received test packets for each of the plurality of tests from the gateway and configured to perform network performance analysis for the RF nodal network based on the received test packets for each of the plurality of tests and to generate updated parameter settings to optimize performance of the nodes of the RF nodal network to attain the target network performance metric based on a result of the network performance analysis corresponding to each of the plurality of tests of the received test packets;
    wherein, the gateway is further configured to receive the updated parameter settings from the server, and to transmit the updated parameter settings to the nodes of the RF nodal network.

2. The system of claim 1, wherein each of the selected nodes is physically located at a periphery of the RF nodal network.

3. The system of claim 1, wherein each of the selected nodes is physically located at a respective distance away from the gateway that is greater than distances of nodes separate from the selected nodes.

4. The system of claim 1, wherein the test packets for each of the plurality of tests comprise a parameter setting which is different from the initial parameters settings.

5. The system of claim 1, wherein the parameter is identical to each of nodes of the RF nodal network.

6. The system of claim 1, wherein the parameter is unique to each of the nodes of the RF nodal network.

7. The system claim 1, wherein the parameter comprises one of retransmission time, scan window, time interval, beacon advertisement, transmission interval or combinations thereof.

8. The system of claim 1, wherein the number of test packets for each of a plurality of tests to be transmitted is selected to meet the target network performance metric.

9. The system of claim 1, wherein the server is configured to:
    generate the control packets to be transmitted via the gateway to the RF nodal network.

10. The system of claim 9, wherein the server is configured to:
    analyze the received test packets for each of the plurality of tests; and
    generate a plurality of network performance metrics corresponding to each of the plurality of tests based on analyzing of the received test packets for each of the plurality of tests; determine that a network performance metric among the plurality of network performance metrics as the target network performance metric.

11. The system of claim 10 wherein to determine, the server is to:
    compare each network performance metric among the plurality of network performance metrics with another network performance metric among the plurality of network performance metrics; and
    update the initial parameter setting of the nodes based on comparison.

12. The system of claim 11, wherein to update the initial parameter setting of the nodes based on comparison the sever is further configured to update the initial parameter setting of the nodes with updated parameter setting corresponding to the test among the plurality of tests associated with the determined network performance metrics.

13. The system of claim 11, wherein the server is further configured to generate another control packets that updates the parameter of each node in the RF nodal network with the updated parameter setting.

14. A method comprising:
    transmitting, by a gateway, through a RF nodal network of nodes, control packets that set a parameter of each node in the RF nodal network to an initial parameter setting, wherein:
        the initial parameter setting configures each of the nodes to perform at a level intended to enable the RF nodal network to meet a target network performance metric,
        the gateway is coupled to the RF nodal network, and each node in the RF nodal network includes a RF device;
    selecting, by the gateway, nodes among the RF nodal network of nodes;
    transmitting, from the selected nodes of the RF nodal network, a number of test packets for each of a plurality of tests to traverse the RF nodal network, the number of the test packet transmitted by the selected nodes being based on a throughput saturation of the RF nodal network such that a number of the test packets transmitted by the selected nodes is greater than throughput saturation of the RF nodal network;
receiving, by the gateway, test packets for each of the plurality of tests;
forwarding, by the gateway, the received test packets for each of the plurality of tests to a server for network performance analysis;
in response to receiving the received test packets for each of a plurality of tests, receiving at the gateway updated parameter settings from the server, wherein the updated parameter settings are configured to optimize performance of the nodes of the RF nodal network to attain the target network performance metric based on a result of a network performance analysis corresponding to each of the plurality of tests of the received test packets; and
transmitting, by the gateway, the updated parameter settings to the nodes of the RF nodal network.

15. The method of claim 14, wherein the test packets for each of the plurality of tests comprise a parameter setting which is different from the initial parameters settings.

16. The method of claim 14, wherein transmitting the test packets comprises:
dividing the number of test packets for each of the plurality of tests into subdivisions of test packets among each of the selected nodes;
assigning to each test packet in the subdivision of test packets a unique number from a sequence of numbers; and
assigning one of the subdivisions to a respective node of the selected nodes for transmission.

17. The method of claim 14, wherein transmitting the test packets for each of the plurality of tests comprises:
transmitting the test packets for each of the plurality of tests from the selected nodes of the RF nodal network, wherein the number of test packets to be transmitted is selected to meet the target network performance metric.

18. The method of claim 14, wherein the parameter comprises one of retransmission time, scan window, time interval, beacon advertisement, transmission interval or combinations thereof.

19. The method of claim 14, wherein the parameter is identical to each of nodes of the RF nodal network.

20. The method of claim 14, wherein the parameter is unique to each of the nodes of the RF nodal network.

21. The method of claim 14, further comprising identifying each of the transmitted packets not received by the gateway based on the unique number assigned to each test packet in the subdivision of the test packets.

22. The method of claim 21, further comprising identifying the respective node of the selected nodes based on the identification of the transmitted packets not received by the gateway.

23. A method comprising:
generating, by a server, control packets to be transmitted via a gateway to a RF nodal network of the nodes, wherein each of the control packets sets a parameter of a node in the RF nodal network to an initial parameter setting, wherein:
the initial parameter setting configures each of the nodes to perform at a level intended to enable the RF nodal network to meet a target network performance metric,
the server is coupled to the gateway, and
wherein each node in the RF nodal network is an RF device;
generating, by the server, a number of test packets for each of a plurality of tests to be transmitted via the gateway to the network of the nodes such that nodes among the network of the nodes are selected and together configured, by the gateway, to transmit a number of test packets for each of the plurality of tests to traverse the RF nodal network, the number of the test packets being based on a throughput saturation of the RF nodal network such that the number of test packets transmitted by the selected nodes is greater than throughput saturation of the RF nodal network and each of the test packets for each of the plurality of tests set each node in the RF nodal network to a parameter setting different from the initial parameter setting;
receiving, by the server, via the gateway, test packets for each of the plurality of tests;
generating, by the server, a plurality of network performance metrics based on analyzing of the received test packets for each of the plurality of tests; and
determining that a network performance metric among the plurality of network performance metrics as the target network performance metric based on a result of the analysis corresponding to each of the plurality of tests of the received test packets.

24. The method of claim 23, wherein the determining comprises:
comparing each network performance metric among the plurality of network performance metrics with another network performance metric among the plurality of network performance metrics; and
updating, by the server, the initial parameter setting of the nodes based on comparison.

25. The method of claim 24, wherein the updating comprises updating the initial parameter setting of the nodes with a parameter setting corresponding to a test among the plurality of tests associated with the determined network performance metric.

26. The method of claim 23, wherein the test packets comprise a parameter setting which is different from the initial parameters settings.

27. The method of claim 23, wherein the parameter comprises one of retransmission time, scan window, time interval, beacon advertisement, transmission interval or combinations thereof.

28. The method of claim 23, wherein the parameter is identical for each of nodes of the RF nodal network.

29. The method of claim 23, wherein the parameter is unique to each of the nodes of the RF nodal network.

30. The method of claim 23, wherein the number of test packets to be transmitted is selected to meet the target network performance metric.

* * * * *